(12) United States Patent
Mukherjee et al.

(10) Patent No.: US 11,397,761 B2
(45) Date of Patent: Jul. 26, 2022

(54) CONTEXT-AWARE REPUTATION OF A PLACE

(71) Applicant: McAfee, LLC, San Jose, CA (US)

(72) Inventors: Joydeb Mukherjee, West Bengal (IN); Saravana Kumar Subramanian, Karnataka (IN); Raj Vardhan, Uttar Pradesh (IN); Rangaswamy Narayana, Karnataka (IN); Shankar Subramanian, Karnataka (IN); Dattatraya Kulkarni, Bangalore (IN); Javed Hasan, Saratoga, CA (US)

(73) Assignee: McAfee, LLC, San Jose, CA (US)

(*) Notice: Subject to any disclaimer, the term of this patent is extended or adjusted under 35 U.S.C. 154(b) by 731 days.

(21) Appl. No.: 15/722,866

(22) Filed: Oct. 2, 2017

(65) Prior Publication Data

US 2018/0025030 A1    Jan. 25, 2018

Related U.S. Application Data

(63) Continuation of application No. 14/498,016, filed on Sep. 26, 2014, now Pat. No. 9,817,843.

(51) Int. Cl.
*G06N 20/00*    (2019.01)
*G06F 16/29*    (2019.01)
(Continued)

(52) U.S. Cl.
CPC ........ *G06F 16/29* (2019.01); *G06F 16/24578* (2019.01); *G06Q 10/10* (2013.01);
(Continued)

(58) Field of Classification Search
CPC ....................... G06F 2221/2111; H04W 4/029
(Continued)

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

| CN | 101730892 A | 6/2010 |
| CN | 102184512 A | 9/2011 |

(Continued)

OTHER PUBLICATIONS

Yuan Tian, Biao Song, et al., Threat-based Evaluation for Context-aware Multimedia Surveillance System, IMCOM (ICUIMC)'14, Jan. 9-11, 2014, Siem Reap, Cambodia. Copyright 2014 ACM, pp. 1-8 (Year: 2014).*

(Continued)

*Primary Examiner* — David R Vincent
(74) *Attorney, Agent, or Firm* — Patent Capital Group

(57) ABSTRACT

A mobile device including: a position locator; a user data engine; and a reputation engine client configured to: receive a location from the position locator; operate the user data engine to provide a user profile, intent, and context data for a user, the context data including dynamic factors about the user, and the profile including relative factors about the user that are relatively static with respect to the context data from the user data engine; and determine a reputation for the location, wherein the reputation is based at least in part on a combination of the user profile, intent, and context.

25 Claims, 8 Drawing Sheets

(51) Int. Cl.
    *G06F 16/2457* (2019.01)
    *H04W 4/029* (2018.01)
    *H04W 4/02* (2018.01)
    *H04L 67/306* (2022.01)
    *G06Q 10/10* (2012.01)
    *G06Q 50/26* (2012.01)
    *H04L 67/52* (2022.01)

(52) U.S. Cl.
    CPC .......... *G06Q 50/265* (2013.01); *H04L 67/18* (2013.01); *H04L 67/306* (2013.01); *H04W 4/02* (2013.01); *H04W 4/029* (2018.02); *Y02A 90/10* (2018.01)

(58) Field of Classification Search
    USPC ...................................... 706/15, 45
    See application file for complete search history.

(56) References Cited

U.S. PATENT DOCUMENTS

| | | | |
|---|---|---|---|
| 6,460,050 | B1 | 10/2002 | Pace et al. |
| 7,506,155 | B1 | 3/2009 | Stewart et al. |
| 8,433,344 | B1* | 4/2013 | Virga ............... G09B 29/106 455/457 |
| 8,515,673 | B2 | 8/2013 | Trinko et al. |
| 8,584,094 | B2 | 11/2013 | Dadhia et al. |
| 8,751,490 | B1 | 6/2014 | Cooley |
| 9,373,267 | B2 | 6/2016 | Sadeh-Koniecpol et al. |
| 9,416,354 | B1 | 8/2016 | Liu |
| 2001/0004600 | A1* | 6/2001 | Son ................... H04W 4/029 455/456.1 |
| 2003/0166996 | A1* | 9/2003 | Kim ..................... A61B 5/165 600/300 |
| 2003/0182394 | A1 | 9/2003 | Ryngler et al. |
| 2009/0007102 | A1 | 1/2009 | Dadhia et al. |
| 2011/0261067 | A1 | 10/2011 | Trinko et al. |
| 2014/0118140 | A1* | 5/2014 | Amis ................... G08B 25/08 340/539.13 |
| 2014/0199663 | A1 | 7/2014 | Sadeh-Koniecpol et al. |
| 2014/0347265 | A1 | 11/2014 | Aimone et al. |
| 2015/0054654 | A1 | 2/2015 | Albinali |
| 2016/0092469 | A1 | 3/2016 | Mukherjee et al. |

FOREIGN PATENT DOCUMENTS

| | | |
|---|---|---|
| WO | 2002099597 A2 | 12/2002 |
| WO | 2014138925 A1 | 9/2014 |
| WO | 2016048557 A1 | 3/2016 |

OTHER PUBLICATIONS

EPO Extended EP Search Report issued in EP Application 15845231.8 dated Jan. 31, 2018, 7 pages.

International Preliminary Report on Patentability issued in PCT Application No. PCT/US2015/046943 dated Mar. 28, 2017; 8 pages.

International Search Report and Written Opinion in International Application No. PCT/US2015/046943 dated Nov. 17, 2015.

USPTO Non-Final Office Action issued in U.S. Appl. No. 14/498,016 dated Mar. 31, 2017; 28 pages.

USPTO Notice of Allowance issued in U.S. Appl. No. 14/498,016 dated Jul. 19, 2017; 12 pages.

\* cited by examiner

CONTEXT-AWARE REPUTATION OF A PLACE

RELATED U.S. APPLICATION INFORMATION

This application is a continuation of (and claims the benefit under 35 U.S.C. § 120) of U.S. application Ser. No. 14/498,016 filed Sep. 26, 2014, entitled "CONTEXT-AWARE REPUTATION OF A PLACE." The disclosure of this application is considered part of and are incorporated by reference herein in its entirety.

FIELD OF THE DISCLOSURE

This application relates to the field of human safety, and more particularly to a device and methods for providing a context-aware reputation of a place.

BACKGROUND

Global positioning systems (GPS) provide a useful aide for users to pinpoint their exact locations with a combination of near-exact latitude and longitude measurements and geographic information system (GIS) data. Thus, a GPS user can know not only his near-exact position on the surface of the earth, but can also view local street-level maps of that location, including surrounding businesses and neighborhoods.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
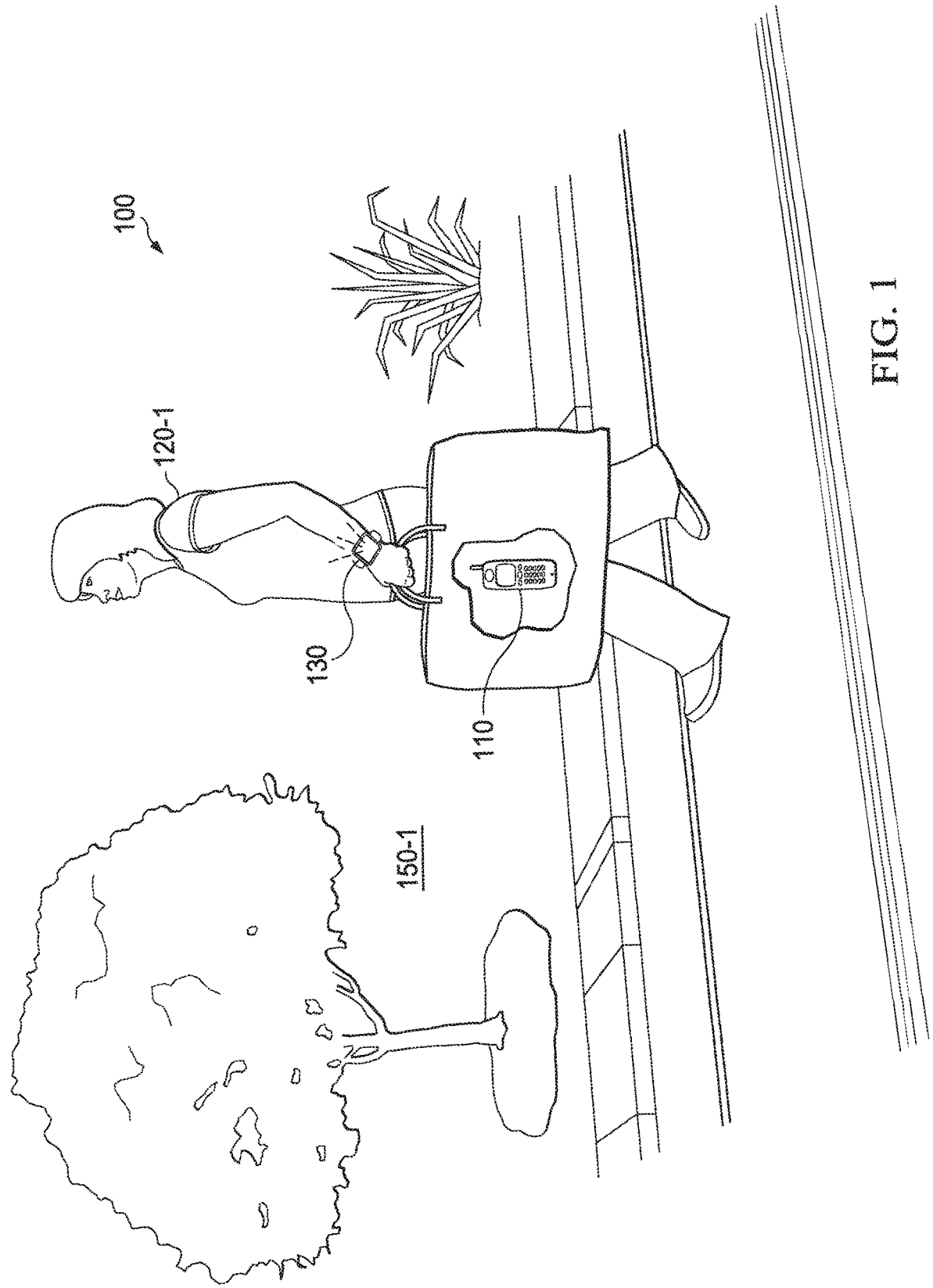
FIG. 1 is a perspective view of a user operating a location reputation system according to one or more examples of the present specification.

There is disclosed in an example a mobile device including: a position locator; a user data engine; and a reputation engine client configured to: receive a location from the position locator; operate the user data engine to provide a user profile, intent, and context data for a user, the context data including dynamic factors about the user, and the profile including relative factors about the user that are relatively static with respect to the context data from the user data engine; and determine a reputation for the location, wherein the reputation is based at least in part on a combination of the user profile, intent, and context.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

This specification describes a location reputation system operable for alerting a user when he or she passes from a first zone with a first reputation to a second zone with a second reputation. The reputation may be based, in part, on past incident reports for that zone. In one example, the device may be used for pedestrian safety within a city. In that case, as the user walks from one zone of the city to another, the location reputation system may operate to warn her if she enters a zone where crime is high, or where she is more likely to encounter a problem. The reputation may be based not only on the mere existence of incidents, but may also account for user-specific factors such as the user's profile, intent, and context. As used throughout this specification, a "profile" includes factors about a user that are relatively time-invariant. These may include, by way of non-limiting example, size, height, weight, age, race, ethnicity, gender, sexual orientation, gender identity status, religious affiliation, party affiliation, distinctive markings, skin color, dignitary status, fiscal worth, training, and time of day. As used throughout this specification, "context" includes factors about a user that are or may be relatively time-variant (for example, that may vary from one outing to the next). These may include, by way of non-limiting example, mode of transportation, equipment, armament, physiological condition, mood, heart rate, stress indicators, body temperature, protection, job function, group size, distance from an operational base, communication capability, and time of day. Context may also include external factors, such as time-of-day and weather. As used throughout this specification, "intent" includes an express or inferred purpose for the user being in the location, such as leisure, shopping, transportation, work purposes, or similar. In some cases, profile, context, and intent may overlap with one another. For example, a user's job function may touch on all three categories.

A reputation for a zone may thus usefully be computed from a plurality of environmental factors. These may be influenced by historical events, such as crime reports. Those factors may be cross-referenced against the user's profile, intent, and context to calculate an overall risk to the user.

For example, a small, unarmed white woman walking alone at night in a zone where there have been a number of reported attacks on white women at night may warrant a higher risk score than a large, armed, black man walking with a large group during the daytime. Conversely, a large white man with an overt and visible gang affiliation walking in a neighborhood claimed by a rival gang may warrant a higher risk score than a small Hispanic woman with no gang affiliation in the same neighborhood.

The user may be equipped with a mobile device and/or wearable computer as an interface to the location reputation system. The division of tasks between the mobile device and a backend server providing a reputation service is quite flexible. In this example, the user may be equipped with a wearable wristband that is locally networked to a mobile device such as a smart phone. The wristband may include biometric sensors, and may be locally networked to the smart phone. Together, the wearable wrist band and smart phone collect and report the user's profile, context, and intent to a location reputation server, along with the user's location based on a device locator, which may include, for example, a GPS receiver or a compass and one or more accelerometers.

After reporting the user data and location data, the smart phone may receive a context-aware reputation for the location relative to the user. The score may be a monolithic scalar score representing a composite of a plurality of weighted factors, or may be a multi-dimensional vector score in which two or more factors each receives separate scores. The score may also have a suitable resolution. For example, in some contexts, it is most useful to provide only a few overall grades, such as "Green" for a zone designated as safe, "Yellow" for a zone designated as questionable, or "Red" for a zone designated as dangerous. In other contexts, it may be most useful to provide high-resolution individual scores on a number of axes, such as a score with an arbitrary resolution for each of risk of encounters, risk of violence, urgency of intent, and the user's capability to handle potential encounters, by way of non-limiting example.

The location reputation system's method of alerting (or not alerting) a user may also vary depending on the context. For example, in one context, it may be beneficial to give the user an attention-grabbing signal such as a bright, flashing light and a loud alarm. In another context, drawing attention to the user herself in this manner could be dangerous or fatal, and so a very subtle warning such as a vibrating watch may be used, or no warning at all. In the case of no warning, the user may simply be given a display that she can access at her discretion on which she can view her current location's reputation.

Although the example of a pedestrian walking in a city has been discussed by way of example, this example is non-limiting. Other non-limiting examples include:

A user who is below legal drinking age may use a location reputation system to alert him if he is entering a business where he is not permitted to be. As an additional feature, the system may also provide to his parents real-time tracking of his location and alert them if he enters a restricted area.

Loggers, forest rangers, or others who operate in harsh or dangerous natural conditions may be provided a warning if they stray into portions of a forest or mountain that is particularly dangerous, such as areas near cliffs or pitfalls, areas known to host aggressive predators, or areas prone to rock slides or avalanches.

Mariners or pilots may be warned if they stray into zones that present navigational hazards, such as dangerous currents, air or water claimed by hostile parties in a war zone, areas prone to piracy, or similar dangers.

Cattle ranchers may affix devices to cattle and be warned if any cattle wander into an area where there is a danger of theft of poaching, or onto property owned or claimed by another party. A device may also be used to warn the rancher himself if he strays across a poorly-marked territorial boundary or into an area where hostilities have been encountered.

Firefighters fighting wild fires may be warned if they enter zones where dangerous backdrafts or other hazards are prone to occur.

Civilians living or working in a war zone may be warned when entering areas where hostilities are prone to occur.

Individuals belonging to a class targeted by "hate crimes" may be warned when entering zones where such crimes have occurred. For example, homosexual or transgender users may be warned when entering zones where homosexual or transgender victims have been targeted.

A dashboard-mounted system may be used to warn a driver when he is entering an area where crime is high, or parking in a lot where burglary from and/or theft of vehicles are common.

In a general sense, any human or non-human user can receive a warning or transmit a warning to a monitoring party when the reputation of a zone changes based on profile, context, and intent.

A location reputation system will now be described with more particular reference to the appended FIGURES.

Figure 3:
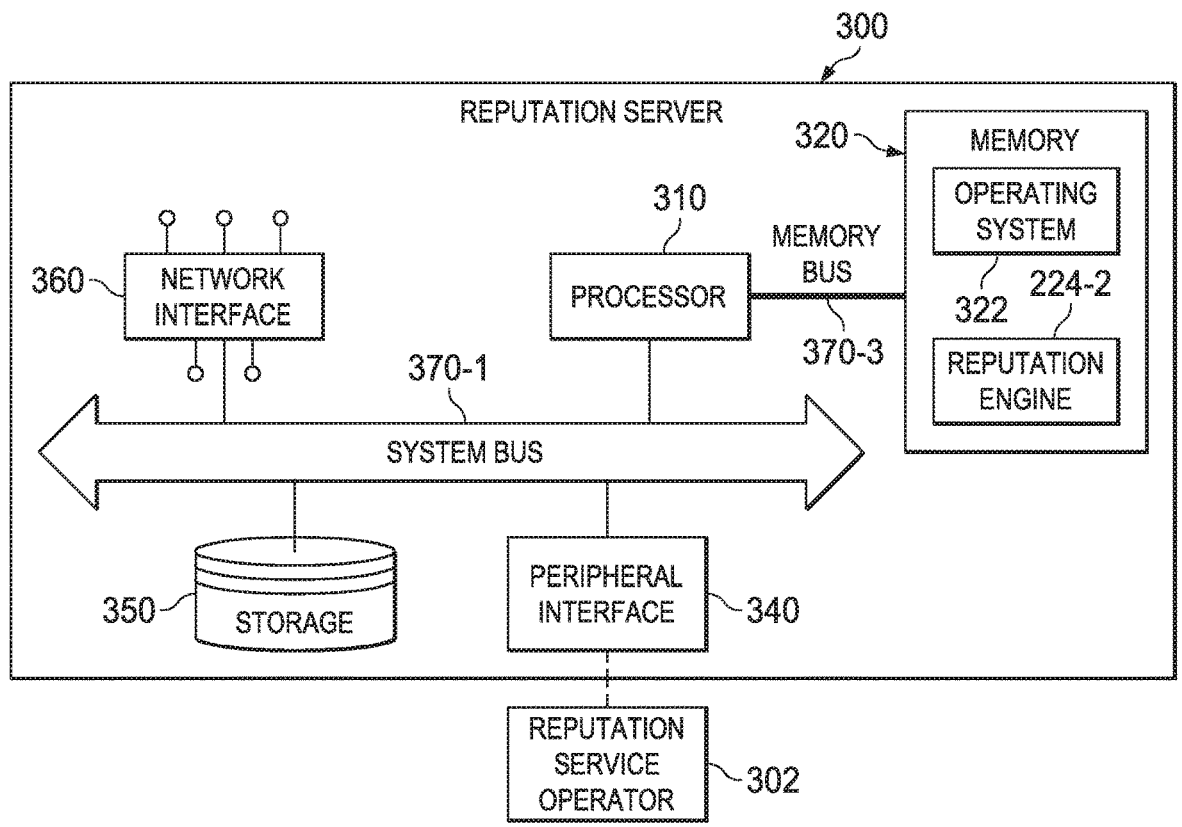
FIG. 3 is a block diagram of a reputation server according to one or more examples of the present specification.

FIG. 1 is a perspective view of a location reputation system 100 according to one or more examples of the present specification. As used throughout this specification, a "location reputation system" comprises any suitable combination of hardware and software operable to carry out the methods disclosed herein. In this example, location reputation system 100 includes a mobile device 110, a wearable device 130, and a reputation server 300 (FIG. 3).

In an example use case, user 120-1 is walking in location 150-1. User 120-1 carries mobile device 110, for example in a bag, pocket, purse, or holster, and also has a wearable device 130, in this case affixed to her arm. User 120-1 may be a safety conscious user who enjoys having the flexibility to travel to various locations to carry out her business, but wants to be aware of when she is entering an area with an increased risk of crime or other harm.

According to methods disclosed in the specification, the bare latitude and longitude of location 150-1 need not be the only factor for assessing the safety of location 150-1. Rather, a number of factors may be considered to provide a more meaningful safety score as it applies user 120-1. For example, if user 120-1 is an unaccompanied, unarmed white female looking for a clothing store, a warning may be appropriate, for example, if it is after dark and location 150-1 is a location with high incidence of violent crimes against whites and or females after dark. A warning may be additionally appropriate if location 150-1 is a location with few shopping options. In that case, the likelihood that user 120-1 will find location 150-1 acceptable for performing her intended task is low, while the danger of user 120-1 meeting with violence or crime may be unacceptably high.

In contrast, if user 120-1 is a black female social worker, is licensed to carry a concealed handgun, and is accompanied by at least one other person, and if user 120-1's purpose in going to location 150-1 is a work-related visit to a child in need of her services, then a warning to user 120-1 may be superfluous and be considered a false positive.

In some cases, a false positive is detrimental not only because it is instantly ignored by the user, but also because if location reputation system 100 regularly provides false positives, then user 120-1 may begin to ignore location reputation system 100 altogether.

In one example, wearable device 130 is equipped with biometric sensors, such as sensors for emotions, heart rate, blood pressure, and skin conductance. When user 120-1 enters location 150-1, mobile device 110 may determine that location 150-1 is a new "zone" (or may simply periodically request updates), and may then request relevant profile, context, and intent data from wearable device 130. This, however, is disclosed by way of example only. In other cases, mobile device 110 may have its own sensors, or may operate without a wearable device 130 at all.

After collecting user data, mobile device 110 may then upload the user data, along with its current location, to a reputation server 300 (FIG. 3) operated by a reputation service operator 302 (FIG. 3). Reputation server 300 may then be configured to calculate a context-aware reputation score for the location. Reputation server 300 delivers this score to mobile device 110, and mobile device 110 may determine whether an alert is appropriate. Again, this is disclosed by way of example only. In other cases, the decision of whether to provide an alert may reside on reputation server 300, or on wearable device 130.

Once the score is computed, mobile device 110 may provide a signal, data packet, or other information to wearable device 130, indicating the value of the score. Wearable device 130 may then take an appropriate action, such as changing a display color on a scale that may range, for example, from green to yellow to orange to red, indicating roughly the range of the scalar score. Wearable device 130 may also include a numerical display that provides a more granular threat value. In other cases, wearable device 130 may provide an additional warning, such as an audible warning, a tactile warning such as vibration, a high visibility warning such as flashing, or any other suitable warning mechanism. It should be noted that these warnings are provided by way of nonlimiting example only, and identical warnings need not be provided in every environment. Indeed, in some embodiments, it is anticipated that no special warning is provided at all. This may be a configurable option. For example, if user 120-1 is entering a suspect location 150-1, it may not be advantageous for her wearable device 130 to behave in a manner that will not draw additional attention to user 120-1. Thus, the warning action may be configured in some cases to get the attention of user 120-1 by more subtle means. In one embodiment, no particular warning is provided, and instead a simple display of a threat score is given. In that case, user 120-1 may simply train herself to regularly check wearable device 130 to determine a local threat score. This will provide user 120-1 with useful information about location 150-1 without unnecessarily drawing attention to wearable device 130 or user 120-1.

Figure 1A:
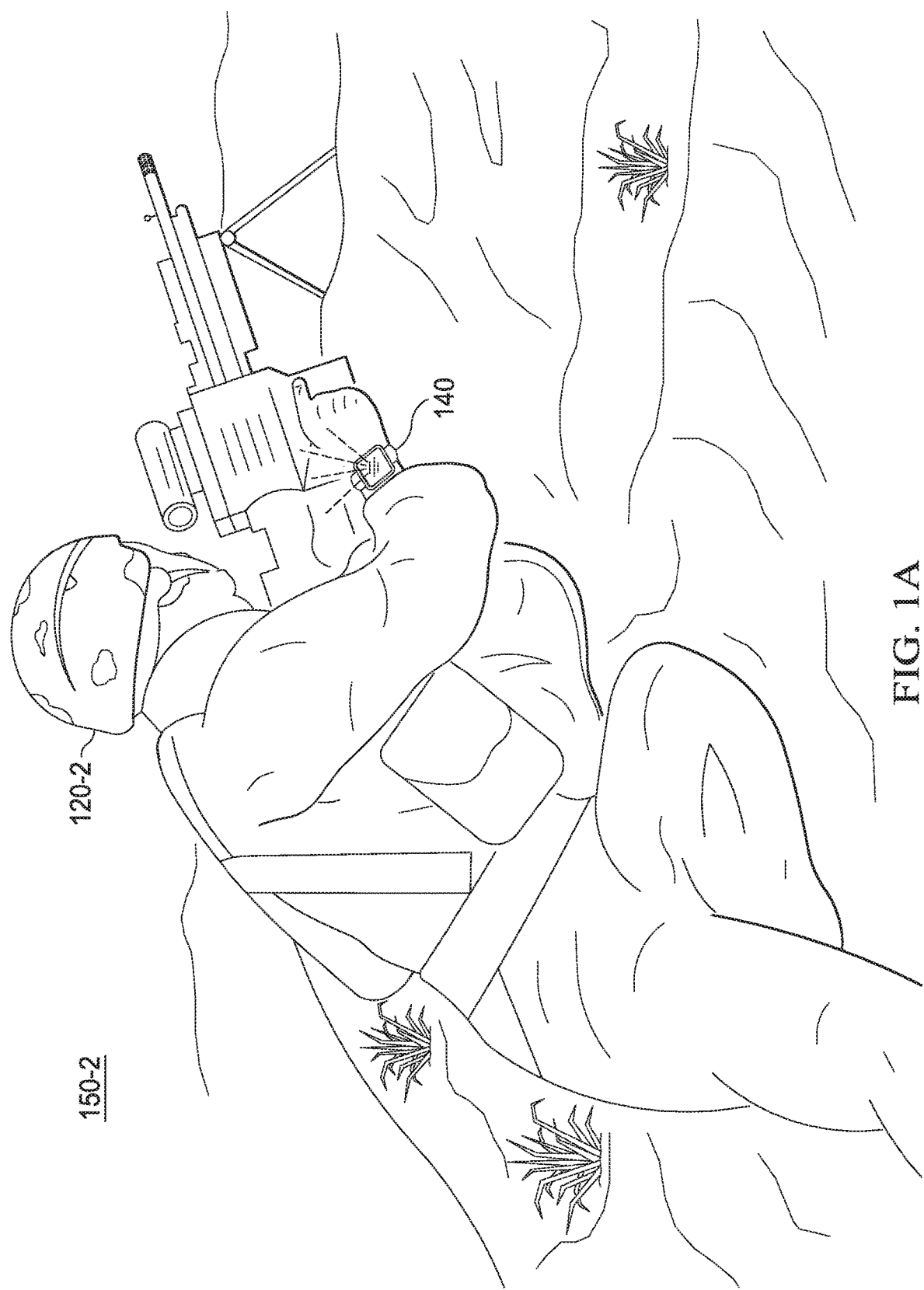
FIG. 1A is a perspective view of a user operating a location reputation system according to one or more examples of the present specification.

FIG. 1A is a perspective view of a second user 120-2 and a second location 150-2 according to one or more examples of the present specification. In this case, user 120-2 may be a combat soldier deployed in a hostile or potentially hostile location. User 120-2 is equipped with an integrated wearable device 140, which may be larger and more capable then wearable device 130 of FIG. 1. For example, integrated wearable device 140 may include all of the relevant functions of mobile device 110 and mobile device 130 of FIG. 1. Thus, in this example, user 120-2 need not carry a separate mobile device 110.

In this case, the danger of integrated mobile device 140 drawing attention to itself or to user 120-2 may be even greater. Thus, integrated wearable device 140 may provide an extremely low profile display, with only relevant and necessary information. In some cases, wearable device 140 may include a manually activated backlight so that user 120-2 can read the display of wearable device 140, or may include a display that in dark conditions can only be viewed by special equipment such as night vision goggles.

As with FIG. 1, a local threat score for location 150-2 should be based not only on the location itself, but also on user data comprising user 120-2's profile, intent, and context. In this case, user 120-2 armed, and may be expected as part of his job function to accept an increased risk, such as making incursions into hostile zones. However, a consideration for user 120-2 may be that he does not wish to accidentally wander into a hostile area without being aware of the threat. It is also beneficial for user 120-2 to simply have information available to him about the relative threat characteristics of location 150-2. In this case, profile metrics for user 120-2 may include his nationality or alignment in hostilities, level of training (e.g., staff officer versus special forces officer), and rank (where increased rank may make him a more desirable target). Context may include his present armament and equipment, size of his accompanying force, communication capabilities, distance from an operating base, availability of support services such as air support, or similar.

In the case of a combat soldier, incidents may not necessarily comprise crimes, but rather encounters with hostile forces. Thus, incident templates may consider proximity to and severity of previous hostile activity, and the nature of previous activities.

In this case, user 120-2 may wish to have available to him additional or more granular details about the nature of the potential threats. Thus, in this context, a simple scalar threat score on a three- or four-value color spectrum may be insufficient. Rather, user 120-2 may require a multi-dimensional threat vector, which one or more vectors having a precision of 8 bits (256 values) or more. Integrated wearable device 140 may also be provided with an interface that allows user 120-2 to retrieve additional details about reported threats.

It may also be beneficial for a headquarters company or the command structure to receive real-time information about where user 120-2 and his associated forces are located. It is just as important, and perhaps even more so, to deny such information to hostile forces. Thus, in one example, integrated wearable device 140 may report its position to a central authority so that a command structure is able to have real-time information about where user 120-2 and related assets are located. Such data may be provided via strong encryption, and using military grade security methods to ensure that hostile forces do not gain access to the information.

These two configurations are provided by way of example only. In some cases, a combination of mobile device 110 and wearable device 130 may be more appropriate for a combat soldier 120-2, while in other cases the use of integrated wearable device 140 may be more desirable for a civilian pedestrian 120-1.

Figure 2:
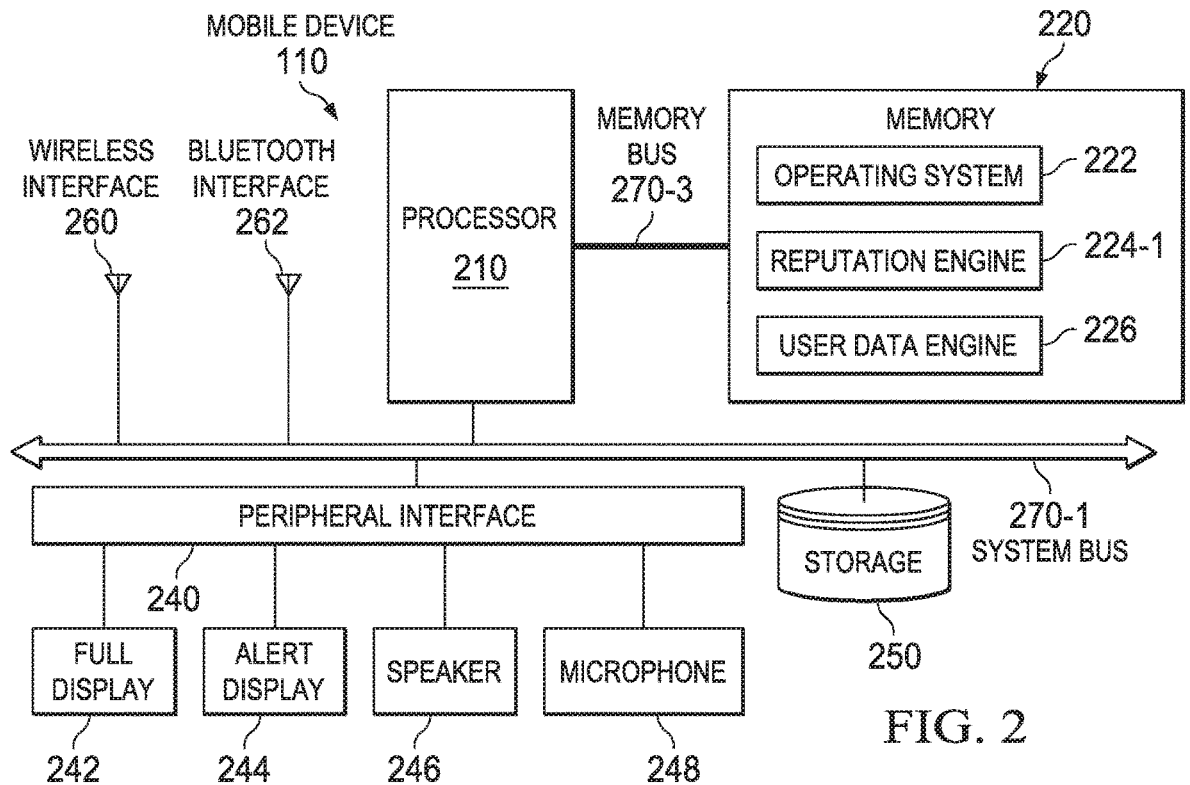
FIG. 2 is a block diagram of a location reputation system according to one or more examples of the present specification.

FIG. 2 is a block diagram of mobile device 110 according to one or more examples of the present specification. Mobile device 110 may be any suitable computing device. In various embodiments, a "computing device" may be or comprise, by way of non-limiting example, a computer, embedded computer, embedded controller, embedded sensor, personal digital assistant (PDA), wearable computer, laptop computer, cellular telephone, IP telephone, smart phone, tablet computer, convertible tablet computer, handheld calculator, or any other electronic, microelectronic, or microelectromechanical device for processing and communicating data. It should be expressly understood that the configuration of mobile device 110 might also be applied, in appropriate circumstances, to wearable device 130 and integrated wearable device 140.

Mobile device 110 includes a processor 210 connected to a memory 220, having stored therein executable instructions for providing an operating system 222 and reputation engine 224-1. In this specification, reputation engine 224 may be used generically to refer to the overall operation of a reputation engine as described herein, while reputation engine 224-1 may refer to portions of the reputation engine that are provided by mobile device 110, wearable device 130, and/or integrated wearable device 140. Reputation engine 224-2 (FIG. 3) refers to portions of reputation engine 224 provided by reputation server 300. As described herein, the division of functions disclosed by way of example is intended to be non-limiting.

Other components of mobile device 110 include a storage 250, network interface 260, and peripheral interface 240.

In an example, processor 210 is communicatively coupled to memory 220 via memory bus 270-3, which may be for example a direct memory access (DMA) bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of reputation engine 224-1. Many other configurations are also possible, and are intended to be encompassed within the broad scope of this specification.

Network interface 260 may be provided to communicatively couple mobile device 110 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 6:
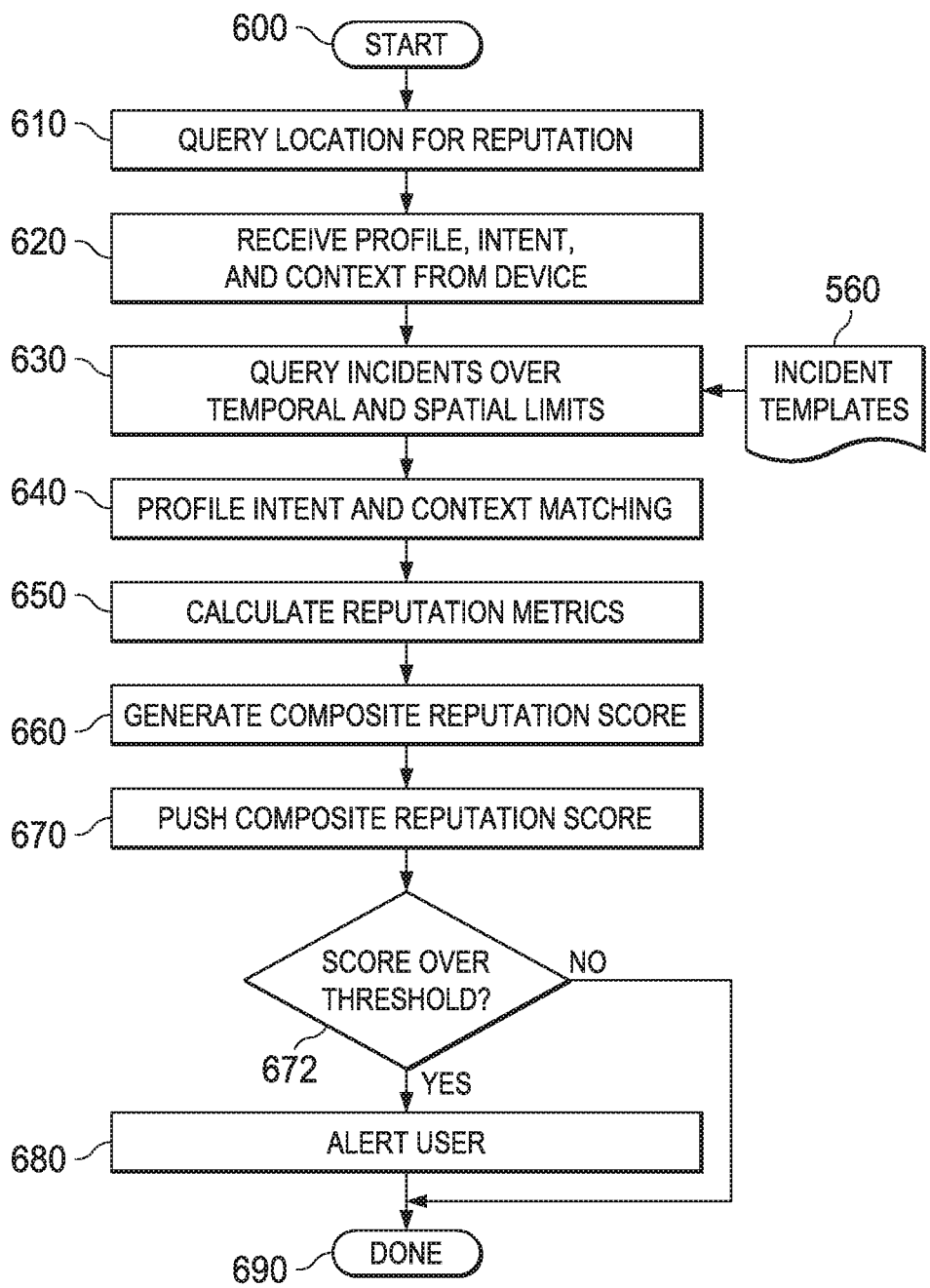
FIG. 6 is a flow chart of a method according to one or more examples of the present specification.

Reputation engine 224-1, in one example, is a utility or program that carries out a method, such as method 600 of FIG. 6, or other methods according to this specification. Reputation engine 224-1 may be, in various embodiments, embodied in hardware, software, firmware, or some combination thereof. For example, in some cases, reputation engine 224-1 may include a special integrated circuit designed to carry out a method or a part thereof, and may also include software instructions operable to instruct a processor to perform the method. In some cases, reputation engine 224-1 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that reputation engine 224-1 is provided by way of non-limiting example only, and that other hardware and software, including interactive or user-mode software, may also be provided in conjunction with, in addition to, or instead of reputation engine 224-1 to perform methods according to this specification.

In one example, reputation engine 224-1 includes executable instructions stored on a non-transitory medium operable to perform method 600 of FIG. 6, or a similar method according to this specification. At an appropriate time, such as upon booting mobile device 110 or upon a command from operating system 222 or a user 120, processor 210 may retrieve a copy of reputation engine 224-1 (or software portions thereof) from storage 250 and load it into memory 220. Processor 210 may then iteratively execute the instructions of reputation engine 224-1.

User data engine 226 is also shown, with software portions provided, by way of example, in memory 220. User data engine 226 may collect, store, and/or report user data comprising the user's profile, context, and intent as appropriate. User data engine 226 may interface with peripheral interface 240 to collect biometric data. User data engine 226 may also include stored user inputs, such as information that user 120 provided upon creating a profile, or user inputs such as an express "intent" input that the user may provide before setting out for a task or at another appropriate time.

Peripheral interface 240 may be configured to interface with any auxiliary device that connects to mobile device 110 but that is not necessarily a part of the core architecture of mobile device 110. A peripheral may be operable to provide extended functionality to mobile device 110, and may or may not be wholly dependent on mobile device 110. In some cases, a peripheral may be a computing device in its own right. Peripherals may include input and output devices such as displays, vibrators, warning lights, biometric or other sensors, terminals, printers, keyboards, mice, modems, network controllers, sensors, transducers, actuators, controllers, data acquisition buses, cameras, microphones, speakers, or external storage by way of non-limiting example. There is shown specifically in this example full display 242, alert display 244, speakers 246, and microphone 248, for use with certain embodiments disclosed herein.

FIG. 3 is a block diagram of reputation server 300 according to one or more examples of the present specification. Reputation server 300 may be any suitable computing device, as described in connection with FIG. 2. In general, the definitions and examples of FIG. 2 may be considered as equally applicable to FIG. 3, unless specifically stated otherwise.

Reputation server 300 includes a processor 310 connected to a memory 320, having stored therein executable instructions for providing an operating system 322 and reputation engine 224-2. Other components of reputation server 300 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of reputation engine 224-2. Many other configurations are also possible, and are intended to be encompassed within the broad scope of this specification.

Network interface 360 may be provided to communicatively couple reputation server 300 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Reputation engine 224-2, in one example, is a utility or program that carries out a method, such as method 600 of FIG. 6, or other methods according to this specification. Reputation engine 224-2 may be, in various embodiments, embodied in hardware, software, firmware, or some combination thereof. For example, in some cases, reputation engine 224-2 may include a special integrated circuit designed to carry out a method or a part thereof, and may also include software instructions operable to instruct a processor to perform the method. In some cases, reputation engine 224-2 may run as a daemon process, as described above. It should also be noted that reputation engine 224-2 is provided by way of non-limiting example only, and that other hardware and software, including interactive or user-mode software, may also be provided in conjunction with, in addition to, or instead of reputation engine 224-2 to perform methods according to this specification.

In one example, reputation engine 224-2 includes executable instructions stored on a non-transitory medium operable to perform method 600 of FIG. 6, or a similar method according to this specification. At an appropriate time, such as upon booting reputation server 300 or upon a command from operating system 322 or a user 120, processor 310 may retrieve a copy of reputation engine 224-2 (or software portions thereof) from storage 350 and load it into memory 320. Processor 310 may then iteratively execute the instructions of reputation engine 224-2.

Peripheral interface 340 may be configured to interface with any auxiliary device that connects to reputation server 300 but that is not necessarily a part of the core architecture of reputation server 300. A peripheral may be operable to provide extended functionality to reputation server 300, and may or may not be wholly dependent on reputation server 300. In some cases, a peripheral may be a computing device in its own right. Peripherals may include, by way of non-limiting examples, any of the devices discussed in connection with peripheral interface 240 of FIG. 2.

Figure 4:
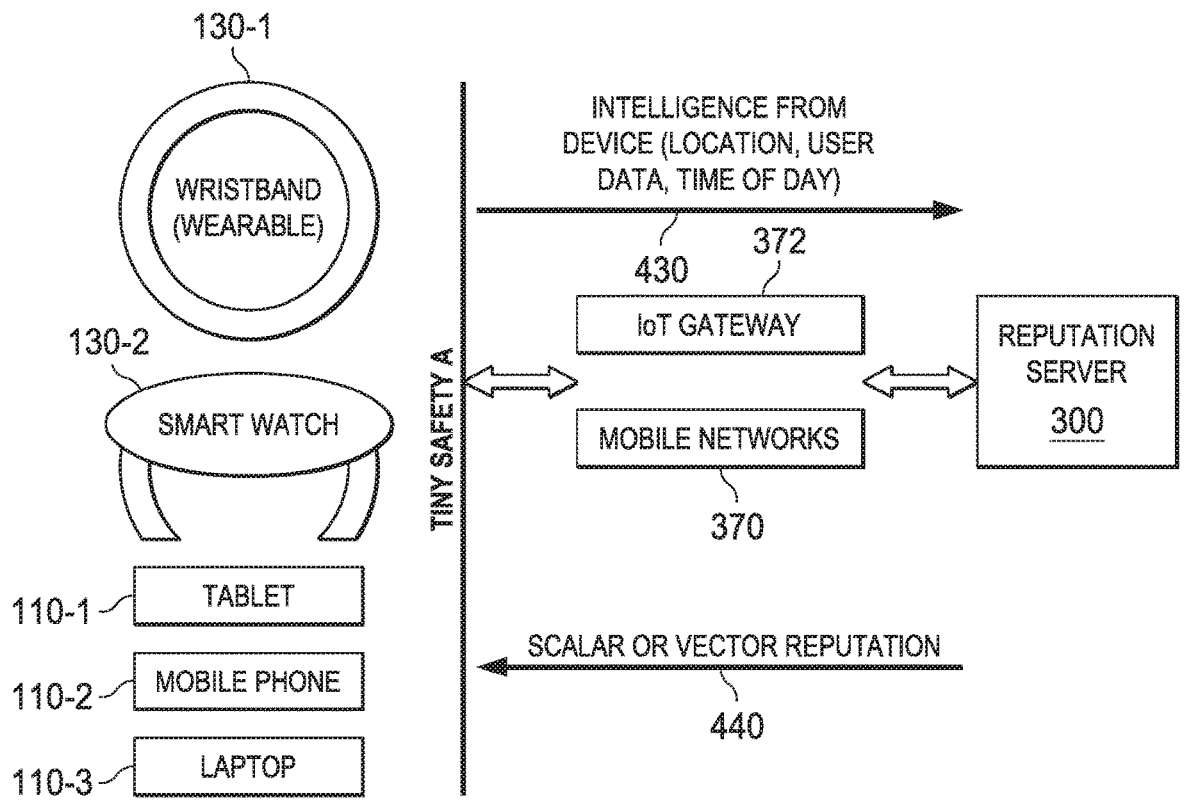
FIG. 4 is a signal flow diagram according to one or more examples of the present specification.

FIG. 4 is a functional block diagram of selected components of location reputation system 100 according to one or more examples of the present specification. In this example, species of wearable device 130 and integrated wearable device 140 may include, by way of nonlimiting example, wearable wristband 130-1, and wearable smart watch 130-2. Other embodiments are also possible, including a customized solution configured specifically to provide a location reputation system. Examples of mobile devices 110 may include a tablet 110-1, a mobile phone 110-2, or a laptop 110-3. Also disclosed herein are a mobile network 370 and an Internet of things Gateway 372. Reputation server 300 may be configured to provide all or part of a reputation engine 224 as described herein.

According to signal chain 430, user devices provide to server 300 intelligence including location, user data comprising, for example, user profile, context, and intent, and time of day, as well as other relevant factors discussed herein.

According to signal chain 440, reputation server 300 provides back to user devices data such as a scalar or vector reputation score. User devices may then provide to user 120 suitable notifications as discussed herein.

Figure 5:
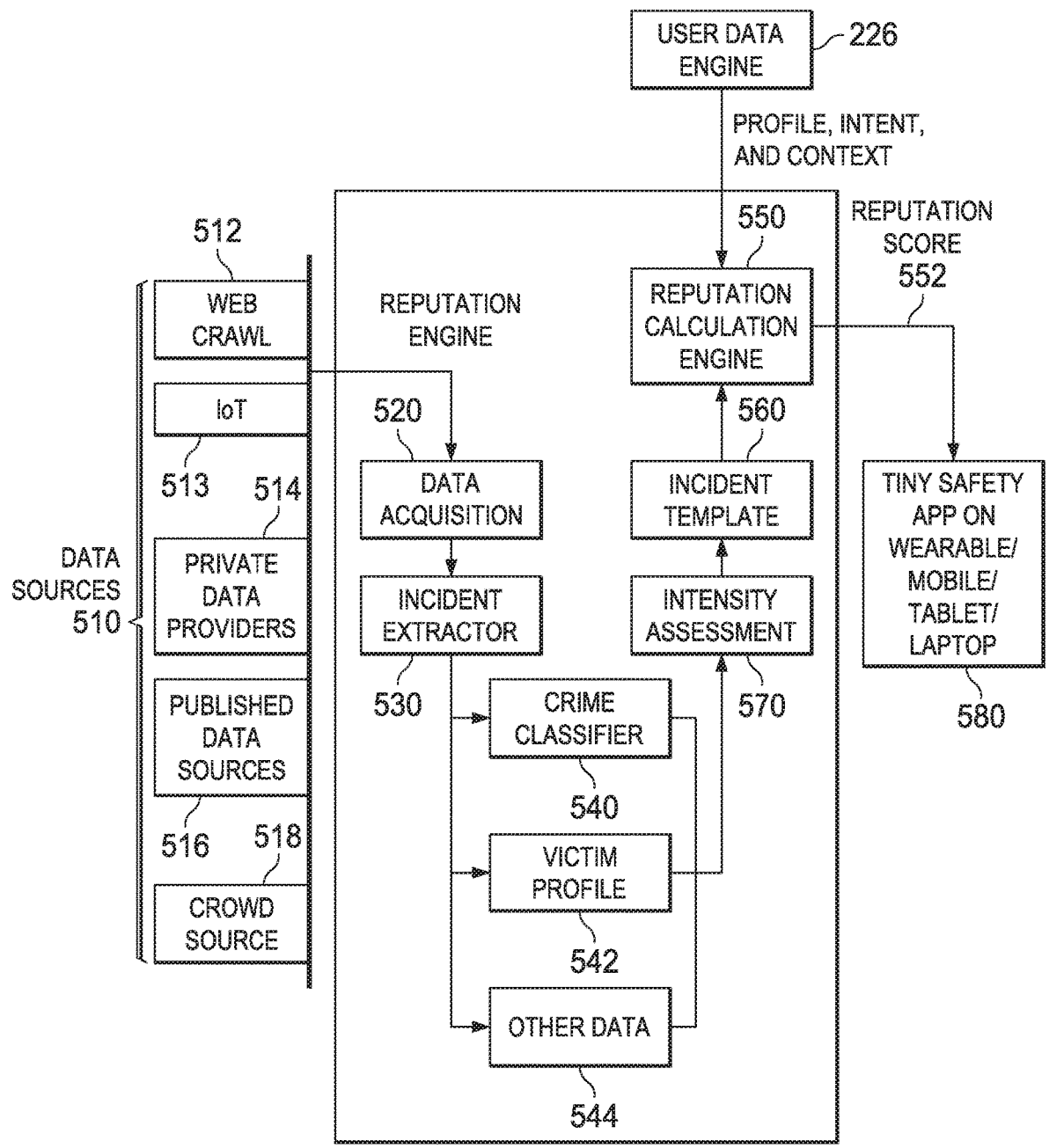
FIG. 5 is a logical block diagram of computing a reputation according to one or more examples of the present specification.

FIG. 5 is a functional block diagram of a location reputation system 100 according to one or more examples of the present specification. FIG. 5 represents in one example an information flow where each block receives zero or more inputs and provides one or more outputs, and wherein blocks are functionally or informationally related to one another. There need not be a one-to-one mapping between the functional blocks of FIG. 5 and a particular hardware or software configuration. In some cases, a single hardware or software platform may provide a plurality of functions listed herein, in other cases a single hardware or software platform may be dedicated to performing a single function disclosed herein, and in yet other cases a plurality of hardware or software platforms may be configured to perform a single function in a distributed manner. It is therefore intended that the functional disclosure of FIG. 5 be broadly construed to cover any suitable hardware and/or software configuration operable and configured to perform the described functions, regardless of how they are distributed.

In this example, a plurality of data sources 510 provides data to reputation engine 224, while user data engine 226 provides user data along with environmental data such as location and time of day. Using these inputs, as well as any other suitable inputs, reputation engine 224 provides reputation score 552 to computing device 110, which in this case may also include wearable device 130, or integrated wearable device 140.

Data sources 510 include any suitable source of data about a particular location. The number and type of data sources 510 may depend on the use context. For example, in a personal safety application for a pedestrian or driver, a large number of distributed data sources may be available. These distributed data sources may provide a broad cross-section of data, and therefore result in a rich data environment. In other more specialized contexts, more limited data sources may be available.

Nonlimiting examples of data sources include a web crawler 512, an internet of things 513, private data providers 514, published data sources 516, and crowd sourced data 518.

Web crawler 512 may be a software application that is designed to intelligently search websites such as online news sources, police reports, and other suitable web resources that may provide useful inputs to a location reputation system. Web crawler 512 may further be configured to parse those data sources and to intelligently extract relevant headlines, stories, or reports for use with location reputation system 100. Web-based data sources may include both free sources, such as freely accessible websites, and paid sources such as pay walled news sites. In the case of payload sites, web crawler 512 may be provided with suitable credentials based on a suitable subscription to the service, which may be provided by reputation service operator 302. In certain examples, reputation service operator 302 may in turn sell subscriptions to its location reputation service, thereby providing a viable commercial enterprise.

In one example, web crawler locates an incident report as follows:

A man was critically injured in a stabbing on Tuesday morning, police officer Gordon Shy said.

The 38-year-old victim was reportedly involved in an argument with five other men in the 300 block of Turk Street at about 4:20 a.m. When the men started throwing things at each other, Shy said, one of the five men stabbed him multiple times in the torso and arm.

Internet of things 513 may also provide useful data. The Internet of things is conceptually a distributed set of sensors, detectors, monitors, and other internet-enabled devices, often running in an embedded platform, and configured to provide a wide array of information to interested services, including reputation server 300. The Internet of things 513 may include cameras, microphones, speed detectors, smart appliances, "black boxes" for vehicles such as cars, watercraft, and aircraft, or any other suitable network enabled device. In some cases, end users of these devices have the option of enabling Internet communication resources, and of providing relevant data to a service. In some cases, the relevant data may be provided anonymously pseudonymously, or pseudo-anonymously. An Internet of things data aggregator may collect these data and again may provide the data via a subscription service. In this case, the Internet of things data aggregator may be, but need not necessarily be, different from an operator of reputation server 300.

Private data providers 514 may include any suitable person or entity that provides data directly to reputation server 300. This may be, for example, a service specifically configured for locating events of potential interest to reputation server 300, formatting data about those events, and providing those data to reputation server 300. This may include a human or computer team employed or hired directly by reputation service provider 302 and which may by intent provide data in a form useful to reputation server 300. In the case of a military application, private data providers 514 may include intelligence gathering or contact reports.

Published data sources 516 may include general-purpose data aggregation services, such as Lexis, Westlaw, or similar. Published data sources 516 may not provide data in a purpose-driven format specifically for reputation server 300, but may provide a large database aggregated from many data sources, including public and private records, which can then be used to usefully format data for reputation service provider 302. In some cases, private data providers 514 and published data sources 516 may include substantial crossover.

Finally, crowd sourced data 518 may also be provided. Crowd sourced data 518 relies on the theory that even minor inputs from a large enough population of volunteer users may in the aggregate provide a useful data source. This may include automated reports from user devices, or manual inputs from a large number of users reporting incidents and activities.

Information from all data sources 510 may be broadly referred to as location data, which is provided to data acquisition block 520. Data acquisition block 520 may be configured to receive data from data sources 510, and may perform some level of conditioning on the data, such as standardizing data into a common format, or parsing out relevant fields from disparate data sources 510.

Data acquisition block 520 provides formatted or conditioned data to incident extractor 530. Incident extractor 530 may operate to subdivide data blocks into a number of data classes. Thus, incident extractor 530 may include internal to itself a data taxonomy useful for classifying portions of each report delivered from data acquisition block 520.

In one example, incident extractor 530 may parse the previously-identified incident as follows:

A man was critically injured in a stabbing on Tuesday morning, police officer Gordon Shy said.

The 38-year-old victim was reportedly involved in an argument with five other men in the 300 block of Turk Street at about 4:20 a.m. When the men started throwing things at each other, Shy said, one of the five men stabbed him multiple times in the torso and arm.

In this example, the data have been classified as follows:
Victim Gender: male ("man").
Victim Age: 38 years ("38-year-old").
Severity: moderately high ("critically injured").
Nature of Crime: battery, assault with a deadly weapon ("stabbing," "stabbed").
Type of Weapon: knife ("stabbing," "stabbed").
Time of Day: early morning ("morning," "4:20 a.m.").
Location: 300-390 Turk St. ("300 block of Turk Street").
Size of Adverse Party: small-medium ("five men").

Incident extractor 530 may then provide data subsets to crime classifier 540, victim profile 542, and other data block 544. Crime classifier 540 may be configured to assign each incident a score, such as a severity. In this example, a murder, for example, may be ranked relatively higher than a nonlethal assault. A nonlethal assault in its turn may be ranked higher than burglary of an unoccupied home. Burglary of an unoccupied home may be ranked higher than burglary of an unoccupied vehicle. These are, of course, provided by way of example only, and a relevant scale may be developed for each particular context.

Crime classifiers may also be scored along two or more axes. For example, a sexual assault on a woman may score higher on a threat axis for female users then on a threat axis for male users. Similarly, an attack by armed opponents may score higher on a threat axis for a supply convoy than for a special forces unit. Thus, it is anticipated that at design time, a system designer will provide one or more relevant axes or dimensions on which to score potential threats.

Victim profile 542 may provide as comprehensive a profile as is available for the victim of each incident, if there is an identifiable victim. It should be noted in this context that a "victim" is used by way of example only. In many contexts suitable to the present disclosure, a specific victim may not be identifiable. However, in many cases, the subject or target of each incident may be classified along one or more axes, and the attributes of each subject or target may in suitable circumstances be compared to user 120.

In block 544, it is recognized that other types of data not explicitly categorized as crime classifiers 540 or victim profiles 540 may be included for each incident. Thus, other data classifier block 544 may classify those other data according to suitable attributes.

Intensity assessment block 570 may be provided to assign an intensity score to each incident. As further discussed herein, the intensity for a single incident may vary across two or more different axes.

In block 560, each incident may be assigned to zero or more incident templates, so that incidents of common types can be grouped together. In some cases, incidents may not fit any of the existing incident templates well, in which case the incident may be assigned sui generis status, and may "stand alone" until a similarly classifiable incident occurs. In the example above, the stabbing may be assigned to a template such as "Non-fatal assault with a deadly weapon."

Finally, templated incidents are provided to a reputation calculation engine 550. Reputation calculation engine 550 also receives user data from user data engine 226. Based on some or all of these inputs, reputation calculation engine 550 calculates a context-aware reputation score 552 for location 150. Reputation score 552 may then be provided, as appropriate, to end-user device 580, which may include some or all of mobile device 110, wearable device 130, or integrated wearable device 140.

FIG. 6 is a flow chart of a method 600 performed by reputation engine 224 according to one or more examples of the present specification. In appropriate circumstances, method 600 may be performed on any suitable computing device, including any or all of mobile device 110, wearable device 130, integrated wearable device 140, or server 300.

It should be noted that the operations disclosed in this method are provided by way of nonlimiting example only, and are not intended to be limiting. In certain embodiments, one or more of the operations disclosed herein may be omitted, may be performed in a different order, or may be altered as appropriate. In other cases, additional operations may be interposed between operations disclosed contiguously in this flowchart. Thus, it should be appreciated, that method 600 is provided by way of example only, and for purposes of illustration and discussion. In certain examples, a system designer will provide design details according to the demands of a particular context.

In block 610, reputation engine 224 queries for a reputation for location 150 of user 120. This may occur automatically, such as when moving between distinct zones, on a schedule, on-demand from user 120, or upon any other suitable stimulus. It should be noted that in some cases this may take the form of a query from mobile device 110 to server 130, or in some cases, the query may be internal to mobile device 110.

In block 620, reputation engine 224 receives data such as user profile, intent, and context from a user device.

In block 630, reputation engine 224 receives incident templates 560. Reputation engine 224 then queries incidents over temporal and spatial limits.

In block 640, reputation engine 224 performs profile intent and context matching according to methods disclosed herein.

In block 650, reputation engine 224 calculates reputation metrics. The calculation of reputation metrics is described with more particularity above, in particular with reference to FIG. 5.

In block 660, reputation engine 224 calculates a composite reputation score. The composite reputation score is provided by way of example only. As described herein, multidimensional reputation scores may also be provided.

In block 670, reputation engine 224 pushes the composite reputation score out to mobile device 110.

In decision block 672, reputation engine 224 determines whether the reputation score is over a threshold.

If the reputation score is not over the threshold, then in block 690, the method is done.

Returning to block 672, if the reputation score is over the threshold, then in block 680, reputation engine 224 may alert user 120. This alert may take the form of any of the alerts disclosed herein.

In block 690, method 600 is done.

Figure 7:
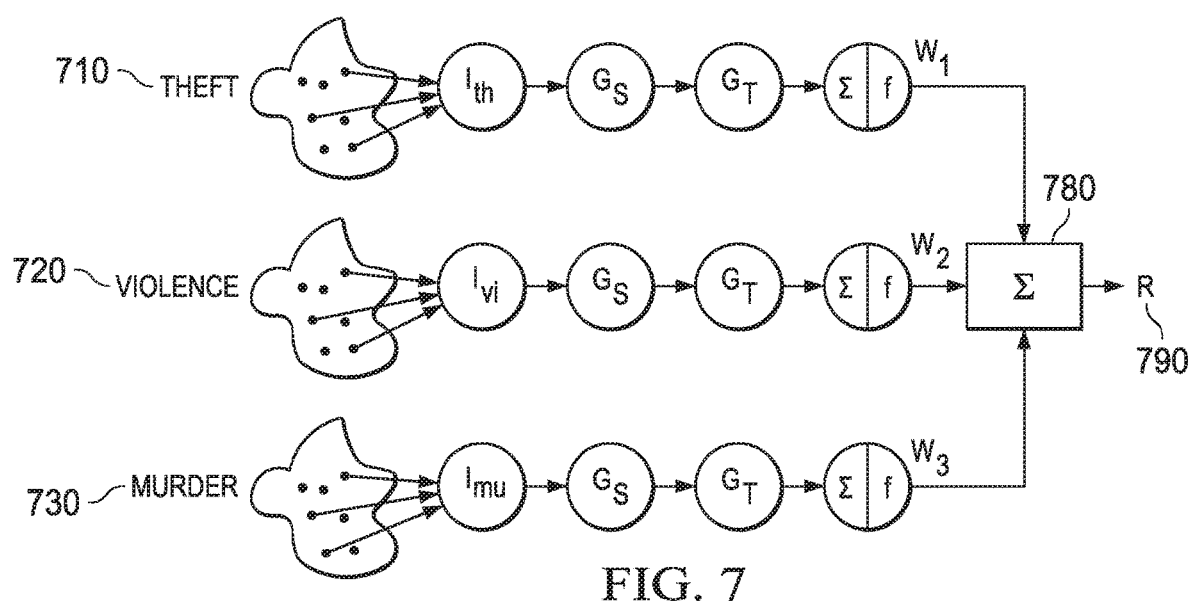
FIG. 7 is a mathematical block diagram according to one or more examples of the present specification.

FIG. 7 is a block diagram of a mathematical method of computing a reputation score according to one or more examples of the present specification. In this example, incident templates for theft 710, violence 720, and murder 730 are provided by way of non-limiting example. Each of these templates may have one or more discrete incidents assigned to it.

A scalar incident score $S_i$ may be computed as:

$$S_i = I(.) * G_S(.) * G_T(.)$$

$S_i$ may be calculated for each incident matching a particular incident or "crime" template, $i \in Cr\{C_1, C_2, \ldots C_N\}$. Note that there may be more than one type of incident and more than one number of incident pertaining to "crime" type i.

The intensity calculation I(.) may be of the form $S_{C_i} = \sum_{j=1}^{\#C_i} I_{C_i} * G_S^{C_i} * G_T^{C_i}(.)$.

In this example I(.) is an intensity factor, and may be a function of the incident or crime itself. For example, $I_{theft} < I_{violence} < I_{murder}$ in this case.

$G_S$ and $G_T$ are spatial and temporal attenuating factors respectively. This recognizes that an incident will have less influence over a reputation as it moves further away both temporally and spatially.

The spatial factor $G_S$ may be a monotonically decreasing function of the spatial distance between the location of the incident and the target location, such as the present location 150 of user 120. In one example, the computation is a Gaussian function of the form:

$$G_S(d, \sigma_S) = e^{-\left(\frac{d}{\sigma_S}\right)^2}$$

In the above example, the function decreases monotonically in Euclidean space, but other units (such as city blocks, for example) could be used. For a custom unit, the highest value of 1 may be assigned to d=0, while the lowest value of 0 may be assigned to $d = k * \sigma_S$.

The temporal factor $G_T$ may be a monotonically decreasing function of the temporal distance between, for example, the occurrence of the incident and the present. In one example, the computation is a Gaussian function of the form:

$$G_T(t, \sigma_T) = e^{-\left(\frac{t}{\sigma_T}\right)^2}$$

The disrepute of each incident may be calculated in one example by a squashing function of the form:

$$d_{C_i} = \frac{1}{1 + \exp(S_{C_i} + b_{C_i})}$$

This squashing function is based in one embodiment on the assumption that the decay of disrepute of a place happens at any instant at a rate proportional to the value of reputation $r_{C_i} = 1 - d_{C_i}$, at that instant, i.e.:

$$\frac{d(d_{C_i})}{dt} = k * (1 - d_{C_i})$$

Where k and $b_{C_i}$ are a proportionality constant and an incident-specific bias term respectively.

Composite incident scores are summed in block 780 into an overall scalar reputation R, where R=1−D, and D (the overall disrepute score) is computed by:

$$D = \sum_{i=1}^{N} W_i * d_{C_i}$$

In this case, $W_i$ may be a fractional impact of an incident type associated with other incidents according to:

$$W_i = \frac{I_i}{\sum_{j}^{N} I_j}$$

With this normalization, D=1−R should lie between 0 and 1.

A multi-dimensional or vector reputation score R 790 may be computed by calculating separate scores along a plurality of axes. For example, separate scores may be computed for males and females, violent and non-violent crimes, fatal and non-fatal incidents, or any combination of user data or environmental data factors where it is useful to provide separate scores along different axes.

Figure 8:
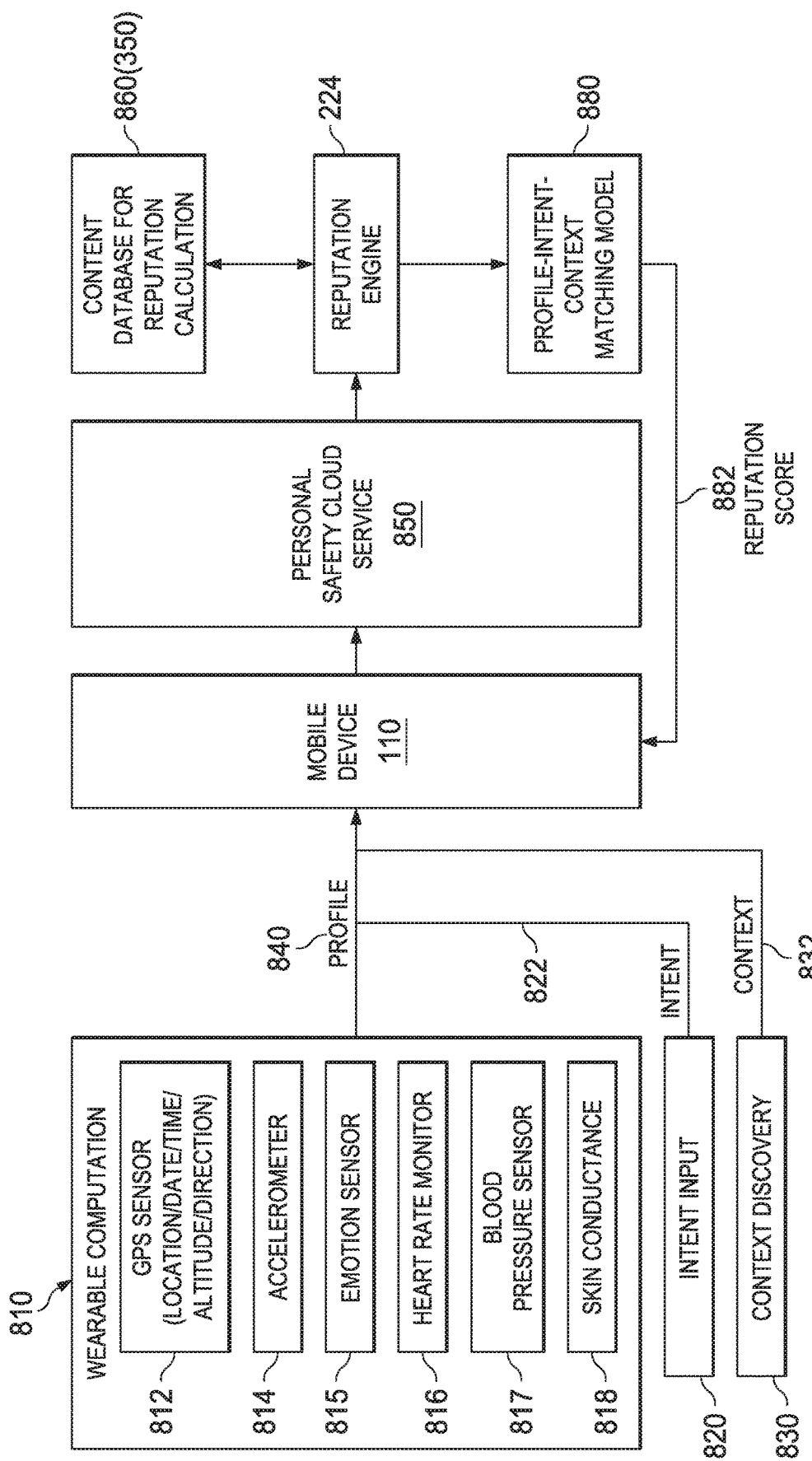
FIG. 8 is a functional block diagram according to one or more examples of the present specification.

FIG. 8 is a functional block diagram of selected portions of location reputation system 100 according to one or more examples of the present specification.

Profile metablock 810 includes functions that in some cases may be provided by a wearable computer, such as wearable device 130 or integrated wearable device 140. These include a location detector, which may be provided by a GPS sensor 812, which may be sensitive not just to latitude and longitude, but also to date, time, altitude, and direction.

An accelerometer 814 may be used to determine when user 120 is in motion, and how fast user 120 is moving. In some cases, an accelerometer 814 may be used in conjunction with a compass to augment latitude and longitude calculations of GPS sensor 812, for example by providing real-time "dead reckoning" updates to GPS coordinates.

An emotion sensor 815 may be used to measure inputs such as perspiration, heart rate, acidity or alkalinity of skin, temperature, or other indicators of emotion, mood, or health.

A heart rate monitor 816 may use be used specifically to determine when user 120's heart rate has increased, which may indicate a stressful situation.

A blood pressure sensor 817 may also provide another dimension of stress indicator.

Skin conductance 818 may provide yet another dimension of mood or emotion indication.

Location outputs may provide location data as described herein. Other outputs of wearable computation block 810 may form part of a user profile or user context.

In block 820, an intent input may be expressly provided by a user 120, for example user 120 may indicate that she is going to work, going shopping, or going on a pleasure stroll. In other cases the intent of user 120 may be inferred by block 820, such as based on the time of day and location.

Context discovery block 830 provides appropriate context 832, as disclosed herein.

Context 832, intent 822, and user profile 840, along with any other relevant inputs, comprise user data. The user data are provided to mobile device 110. Mobile device 110 may upload some or all of the user data to a personal safety cloud service 850. The reputation server 300 may provide this.

Personal safety cloud service 850 may provide major portions of reputation engine 224. This may include a content database for reputation calculations 860, which may be hosted for example on storage 350, or on a dedicated database server. Block 880 provides profile intent and context matching models. This provides a reputation score 882 back to mobile device 110.

Figure 9:
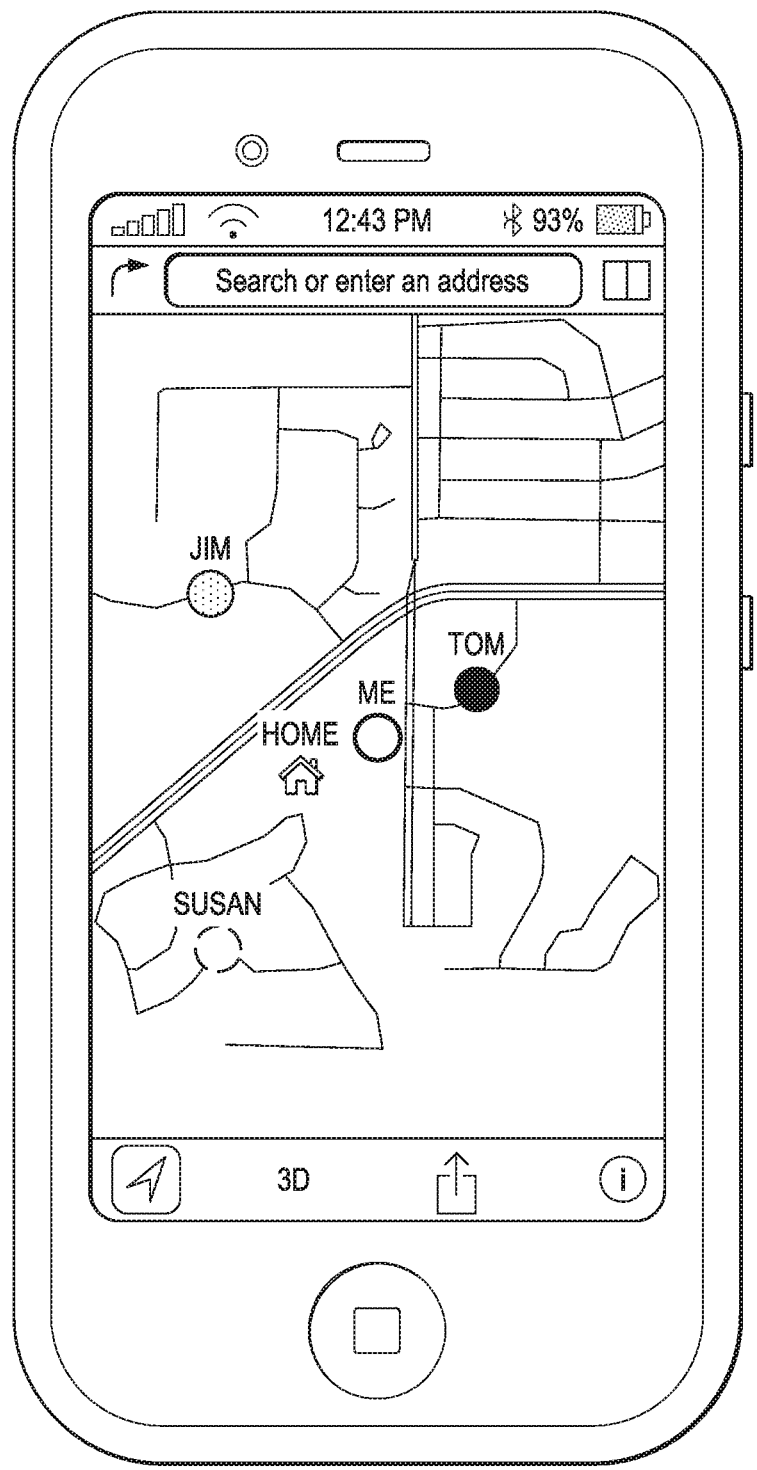
FIG. 9 is a view of a user interface according to one or more examples of the present specification.

FIG. 9 is a view of an example graphical user interface according to one or more examples of the present specification. This interface may be provided in one embodiment on mobile device 110, and may include a GPS map overlay. In this case, a "ME" icon indicates the location of user 120. Additional icons for "JIM" and "TOM" may also be provided. In one example, the "ME" icon is green, indicating a high reputation for safety. The "JIM" icon may be yellow, indicating an intermediate reputation. The "TOM" icon may be red, indicating a low reputation. This may allow user 120 to keep track of other users' locations and their relative safeties, for any of the legitimate purposes disclosed herein or for any other legitimate purpose.

This also illustrates another aspect of reputation, namely that user 120 may generally consider locations close to his home location (or other base of operations) to be relatively more "safe" than locations far away from his home. Thus, distance from the home location may in some cases be a factor that influences an overall reputation.

In other cases, the "home" location may be used to infer user demographics such as income and social status. For example, a rural or suburban user may be more sensitive to incidents of car burglary and graffiti, while an urban user may consider such incidents to be more routine. Such demographic data may be expressly input in certain embodiments, for example through a questionnaire that asks user 120, upon setting up the application, to subjectively rate the severity of certain types of incidents.

Demographic data may also be used, for example, to calculate the value of an individual as a target. For example, in an area where kidnapping is a danger, a wealthy person, or relative of a wealthy person, may have a high monetary value and therefore be a more lucrative target for a kidnapping. In a military context, a higher-ranking officer may be a more valuable target to capture or kill than an enlisted soldier. In areas where human trafficking occurs, individuals with certain desirable characteristics may be more sought-after targets for abduction.

Proximity to a home location may also influence the ability of user 120 to call on others for help. In a civilian context, a user who is able to call his wife or a police officer for assistance may be in less danger than a man walking alone far from home. In a military, industrial, or dangerous work environment, the nearby availability of reinforcements, support, or other aid, may also be an influencing factor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in application-specific integrated circuits (ASICs), field-programmable gate arrays (FPGAs), and other semiconductor chips.

In example implementations, at least some portions of the processing activities outlined herein may also be implemented in software. In some embodiments, one or more of these features may be implemented in hardware provided external to the elements of the disclosed FIGURES, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the buffers, graphics elements, interconnects, clocks, DDRs, sensors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in example 1 a mobile device comprising: a position locator; a user data engine; and a reputation engine client configured to: receive a location from the position locator; operate the user data engine to provide a user profile, intent, and context data for a user, the context data comprising dynamic factors about the user, and the profile comprising relative factors about the user that are relatively static with respect to the context data from the user data engine; and determine a reputation for the location, wherein the reputation is based at least in part on a combination of the user profile, intent, and context.

There is disclosed in example 2 the mobile device of example 1, wherein the position locator comprises a global positioning system (GPS) receiver.

There is disclosed in example 3 the mobile device of example 1, wherein the position locator comprises an accelerometer.

There is disclosed in example 4 the mobile device of example 1, wherein the reputation engine client is further configured to provide a user warning based on the reputation for the location.

There is disclosed in example 5 the mobile device of example 1, wherein determining a reputation for the location comprises locally calculating a context-aware human safety reputation for the location.

There is disclosed in example 6 the mobile device of example 5, wherein calculating the context-aware human safety reputation for the location comprises a computation of the form $S\_i = I(.) * G\_S(.) * G\_T(.)$, wherein $G\_S$ is a spatial influence factor, and $G\_T$ is a temporal influence factor.

There is disclosed in example 7 the mobile device of example 6, wherein a score for each type of incident comprises a computation of the form $S\_(C\_i) = \Sigma\_{(j=1)}^{(\#C\_i)} [I\_(C\_i) * G\_S^{\wedge}(C\_i)(.) * G\_T^{\wedge}(C\_i)(.)]$.

There is disclosed in example 8 the mobile device of example 7, wherein $G\_S$ is a monotonically decreasing function of a distance between the target location and an incident location.

There is disclosed in example 9 the mobile device of example 8, wherein $G\_S$ is to be computed according to $G\_S(d, \sigma\_S) = e^{\wedge}(-(d/\sigma\_s)^{\wedge}2)$.

There is disclosed in example 10 the mobile device of example 9, wherein $G\_T$ is to be computed according to $G\_T(t, \sigma\_T) = e^{\wedge}(-(t/\sigma\_T)^{\wedge}2)$.

There is disclosed in example 11 the mobile device of example 5, wherein calculating the context-aware reputation for the location relative to the user comprises extracting one or more incidents from the incident data, and classifying each incident according to an incident severity and a subject profile.

There is disclosed in example 12 the mobile device of example 5, wherein the context-aware reputation is a scalar.

There is disclosed in example 13 the mobile device of example 5, wherein the context-aware reputation is a multi-dimensional vector.

There is disclosed in example 14 the mobile device of example 5, wherein the user data comprises a profile factor selected from the group consisting of size, height, weight, age, race, ethnicity, gender, sexual orientation, gender identity status, religious affiliation, party affiliation, distinctive markings, skin color, dignitary status, fiscal worth, and training.

There is disclosed in example 15 the mobile device of example 5, wherein the user data comprises a context factor selected from the group consisting of mode of transportation, equipment, armament, protection, physiological condition, mood, heart rate, stress indicators, body temperature, job function, group size, distance from an operational base, communication capability, time of day, and weather.

There is disclosed in example 16 the mobile device of example 5, wherein the user data comprises a purpose factor.

There is disclosed in example 17 the mobile device of example 5, wherein determining the reputation for the location comprises receiving the reputation from a reputation server.

There is disclosed in example 18 a wearable computing device comprising the mobile device of example 1.

There is disclosed in example 19 one or more tangible, non-transitory, computer-readable mediums having stored thereon executable instructions for providing reputation of a place on a mobile device, the instructions to cause a hardware platform to: receive a location from a position locator; receive user profile, intent, and context data for a user, the context data comprising dynamic factors about the user, and the profile comprising relative factors about the user that are relatively static with respect to the context data from the user data engine; and determine a reputation for the location, wherein the reputation is based at least in part on a combination of the user profile, intent, and context.

There is disclosed in example 20 the one or more tangible, non-transitory computer-readable mediums of example 19, wherein the reputation engine client is further configured to provide a user warning based on the reputation for the location.

There is disclosed in example 21 the one or more tangible, non-transitory computer-readable mediums of example 19, wherein determining the reputation for the location comprises locally calculating a context-aware human safety reputation for the location.

There is disclosed in example 22 the one or more tangible, non-transitory computer-readable mediums of example 19, wherein calculating the context-aware human safety reputation for the location comprises a computation of the form $S\_i = I(.) * G\_S(.) * G\_T(.)$, wherein $G\_S$ is a spatial influence factor, and $G\_T$ is a temporal influence factor.

There is disclosed in example 23 the one or more tangible, non-transitory computer-readable mediums of example 19, wherein determining the reputation for the location comprises receiving the reputation from a reputation server.

There is disclosed in example 24 a computer-implemented method of providing reputation of a place on a mobile device, comprising: receiving a location from a position locator; receiving user profile, intent, and context data for a user, the context data comprising dynamic factors about the user, and the profile comprising relative factors about the user that are relatively static with respect to the context data from the user data engine; and determining a reputation for the location, wherein the reputation is based at least in part on a combination of the user profile, intent, and context.

There is disclosed in example 25 the method of example 24, wherein determining the reputation for the location comprises locally calculating a context-aware human safety reputation for the location.

There is disclosed in example 26 the method of example 25, wherein determining the reputation for the location comprises receiving the reputation from a reputation server.

What is claimed is:

1. A mobile device comprising:
    a position locator;
    a biometric sensor that receives an input; and
    a processor configured to execute
        a user data engine, and
        a reputation engine client configured to
            receive a location from the position locator;
            operate the user data engine to provide a user profile, intent, and context data for a user, at least one of the intent or the context data based on the input from the biometric sensor, the context data comprising dynamic factors about the user, and the profile comprising relative factors about the user that are relatively static with respect to the context data from the user data engine; and
            determine a reputation for the location, wherein the reputation is based at least in part on a combination of the user profile, intent, and context, a calculation of a context-aware human safety reputation for the location is performed, the calculation comprises a computation of the form $S_i = I(.) * G_s(.) * G_t(.)$, $S_i$ is a scalar incident score, $I(.)$ is an intensity factor or calculation, $G_s$ is a spatial influence factor, and $G_T$ is a temporal influence factor.

2. The mobile device of claim 1, wherein the position locator comprises a global positioning system (GPS) receiver.

3. The mobile device of claim 1, wherein the position locator comprises an accelerometer.

4. The mobile device of claim 1, wherein the reputation engine client is further configured to provide a user warning based on the reputation for the location.

5. The mobile device of claim 1, wherein determining the reputation for the location comprises locally calculating the context-aware human safety reputation for the location.

6. A mobile device, comprising:
    a position locator;
    a user data engine; and
    a reputation engine client configured to
        receive a location from the position locator;
        operate the user data engine to provide a user profile, intent, and context data for a user, the context data comprising dynamic factors about the user, and the profile comprising relative factors about the user that are relatively static with respect to the context data from the user data engine; and
        determine a reputation for the location, wherein the reputation is based at least in part on a combination of the user profile, intent, and context, the determining the reputation for the location comprises locally calculating a context-aware human safety reputation for the location, the calculating the context-aware human safety reputation for the location comprises a computation of the form $S_i=I(.)*G_s(.)*G_t(.)$, $S_i$ is a scalar incident score, $I(.)$ is an intensity factor or calculation, $G_s$ is a spatial influence factor, and $G_T$ is a temporal influence factor.

7. The mobile device of claim 6, wherein a score for each type of incident comprises a computation of the form $S_{C_i}=\Sigma_{j=1}^{\#C_i} I_{C_i^j}*G_S^{C_i^j}*G_T^{C_i^j}(.)$.

8. The mobile device of claim 7, wherein $G_S$ is a monotonically decreasing function of a distance between the target location and an incident location.

9. The mobile device of claim 8, wherein $G_S$ is to be computed according to $$G_S(d, \sigma_S) = e^{-\left(\frac{d}{\sigma_S}\right)^2}.$$

10. The mobile device of claim 9, wherein $G_T$ is to be computed according to $$G_T(t, \sigma_T) = e^{-\left(\frac{t}{\sigma_T}\right)^2}.$$

11. The mobile device of claim 5, wherein calculating the context-aware reputation for the location relative to the user comprises extracting one or more incidents from the context data, and classifying each incident according to an incident severity and a subject profile.

12. The mobile device of claim 5, wherein the context-aware reputation is a multi-dimensional vector.

13. The mobile device of claim 5, wherein the profile comprises a profile factor selected from the group consisting of size, height, weight, age, race, ethnicity, gender, sexual orientation, gender identity status, religious affiliation, party affiliation, distinctive markings, skin color, dignitary status, fiscal worth, and training.

14. The mobile device of claim 5, wherein the context comprises a context factor selected from the group consisting of mode of transportation, equipment, armament, protection, physiological condition, mood, heart rate, stress indicators, body temperature, job function, group size, distance from an operational base, communication capability, time of day, and weather.

15. The mobile device of claim 5, wherein determining the reputation for the location comprises receiving the reputation from a reputation server.

16. One or more tangible, non-transitory, computer-readable mediums having stored thereon executable instructions for providing reputation of a place on a mobile device, the instructions to cause a hardware platform to:
receive a location from a position locator;
receive an input from a biometric sensor;
receive user profile, intent, and context data for a user, at least one of the intent or the context data based on the input from the biometric sensor, the context data comprising dynamic factors about the user, and the profile comprising relative factors about the user that are relatively static with respect to the context data; and
determine a reputation for the location, wherein the reputation is based at least in part on a combination of the user profile, the intent, and the context data, a calculation of a context-aware human safety reputation for the location is performed, the calculation comprises a computation of the form $S_i=I(.)*G_s(.)*G_t(.)$, $S_i$ is a scalar incident score, $I(.)$ is an intensity factor or calculation, $G_s$ is a spatial influence factor, and $G_T$ is a temporal influence factor.

17. The one or more tangible, non-transitory computer-readable mediums of claim 16, wherein the instructions are further to provide a user warning based on the reputation for the location.

18. The one or more tangible, non-transitory computer-readable mediums of claim 16, wherein determining the reputation for the location comprises locally calculating the context-aware human safety reputation for the location.

19. The one or more tangible, non-transitory computer-readable mediums of claim 16, wherein determining the reputation for the location comprises receiving the reputation from a reputation server.

20. A computer-implemented method of providing reputation of a place on a mobile device, comprising:
receiving a location from a position locator;
receiving an input from a biometric sensor;
receiving user profile, intent, and context data for a user, at least one of the intent or the context data based on the input from the biometric sensor, the context data comprising dynamic factors about the user, and the profile comprising relative factors about the user that are relatively static with respect to the context data; and
determining a reputation for the location, wherein the determining is based at least in part on combining the user profile, the intent, and the context data, the determining comprises a computation of the form $S_i=I(.)*G_s(.)*G_t(.)$, $S_i$ is a scalar incident score, $I(.)$ is an intensity factor or calculation, $G_s$ is a spatial influence factor, and $G_T$ is a temporal influence factor.

21. The method of claim 20, wherein determining the reputation for the location comprises locally calculating a context-aware human safety reputation for the location.

22. The method of claim 20, wherein determining the reputation for the location comprises receiving the reputation from a reputation server.

23. The mobile device of claim 1, wherein the biometric sensor is a heart rate monitor.

24. The mobile device of claim 12, wherein the multi-dimensional vector is computed by calculating a plurality of scores along a plurality of axes.

25. The mobile device of claim 1, wherein the reputation engine client is further configured to alert a user, based on a determination that the reputation is over a threshold.

* * * * *

UNITED STATES PATENT AND TRADEMARK OFFICE
CERTIFICATE OF CORRECTION

PATENT NO. : 11,397,761 B2
APPLICATION NO. : 15/722866
DATED : July 26, 2022
INVENTOR(S) : Joydeb Mukherjee et al.

Page 1 of 1

It is certified that error appears in the above-identified patent and that said Letters Patent is hereby corrected as shown below:

In the Claims

In Column 23, Claim 7, Line 11, delete "$S_{C_i} = \sum_{j=1}^{\#C_i} I_{C_i} * G_S^{C_i} * G_T^{C_i}(.)$" and insert --$S_{C_i} = \sum_{j=1}^{\#C_i} I_{C_i} * G_S^{C_i}(.) * G_T^{C_i}(.)$--, therefor.

Signed and Sealed this
Third Day of January, 2023

Katherine Kelly Vidal
*Director of the United States Patent and Trademark Office*